United States Patent
Shu et al.

(10) Patent No.: US 7,821,370 B1
(45) Date of Patent: Oct. 26, 2010

(54) CONNECTOR WITH A SHUTTER MECHANISM PIVOTALLY RETAINED THEREON

(75) Inventors: Fang-Hua Shu, Kunshan (CN);
Jia-Yong He, Kunshan (CN);
Zhong-Hua Yao, Kunshan (CN);
Qi-Sheng Zheng, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/701,608

(22) Filed: Feb. 8, 2010

(30) Foreign Application Priority Data

Apr. 27, 2009 (CN) .................... 2009 2 0302592 U

(51) Int. Cl.
*H01F 27/04* (2006.01)
(52) U.S. Cl. ...................................... 336/107; 439/138
(58) Field of Classification Search ................. 336/107, 336/192, 200; 439/135–139, 142–144
See application file for complete search history.

(56) References Cited

U.S. PATENT DOCUMENTS

| | | | |
|---|---|---|---|
| 6,368,123 B2 * | 4/2002 | Uchiyama et al. | 439/138 |
| 7,150,645 B2 * | 12/2006 | Huang | 439/378 |
| 7,309,259 B2 * | 12/2007 | Sun et al. | 439/630 |
| 2004/0248443 A1 * | 12/2004 | Lai et al. | 439/137 |

FOREIGN PATENT DOCUMENTS

CN 201096919 8/2008

* cited by examiner

*Primary Examiner*—Tuyen T. Nguyen
(74) *Attorney, Agent, or Firm*—Wei Te Chung; Andrew C. Cheng; Ming Chieh Chang

(57) ABSTRACT

A connector includes: an insulative housing having a mating port formed between a pair of front wall and rear wall, and a pair of side walls thereof, the mating port defining a first direction for mating/un-mating a corresponding plug, and a second direction extending transversely and perpendicular to said first direction, and a third direction extending vertically and perpendicular to both said first and second directions; a shutter mechanism pivotally mounted to the insulative housing and having a pair of axles extending from two sides thereof in the second direction; wherein the side wall defines a first slot at an inner side thereof and a second slot at an outer side thereof, the second slot extending in the first direction, the first slot extending in a direction different from the second slot and overlapping with the second slot in the second direction to form an opening to receive the axles.

20 Claims, 5 Drawing Sheets

CONNECTOR WITH A SHUTTER MECHANISM PIVOTALLY RETAINED THEREON

BACKGROUND OF THE INVENTION

1. Field of the Invention

The present invention generally relates to a connector and more particularly to a connector with a shutter mechanism pivotally retained thereon.

2. Description of Related Art

In recent years, in household equipment of which DVD is representative, digital audio signal transmission by optical signals is becoming widespread. The receiving and transmitting portions of such digital audio signal transmission are provided with a mechanism that, when signal transmission is not performed, prevent the invasion of dust and other foreign substances into the part where the light receiving and transmitting portion is optically/mechanically joined with the plug portion of the fiber-optic cable, and that protect the eyes from light leakage.

As this sort of mechanism, in the conventional technology, shutter mechanisms were used such as a type in which a protective cap is fitted on the insertion portion, and a type in which a cover opens and closes in response to plug insertion and removal. In recent years, many products have been provided with these shutter mechanisms for the sake of convenience and preventing the accidental invasion described above.

Optical transmission devices provided with this type of shutter mechanism include a case that holds an optical element that receives and/or transmits light, the case being provided with a plug insertion hole into which a plug for transmitting an optical signal is inserted; a shutter mechanism that opens and closes this plug insertion hole, and a spring driving the shutter moving to open or close the plug insertion hole. The case has a pair of side walls each of which defines an opening extending therethrough in a transverse direction of the case and a pair of posts extending downwardly to position the optical transmission device to a circuit board. The openings communicate with the plug insertion hole and exterior to conveniently position the shutter mechanism and easily being formed.

The shutter mechanism has a shutter covering the plug insertion hole from a front side and a pair of axles at two sides thereof to engage with the openings. When a plug is not inserted, the shutter closes the plug insertion hole by being resisted by the spring at a rear side thereof. When inserting a plug, the shutter is pushed inside along with this plug insertion. When the plug is removed, there is movement opposite to that when the plug is inserted.

The optical transmission device is formed by a pair of front and rear molds to form the plug insertion hole, a pair of upper and lower molds to form the posts and a pair of left and right molds to form the openings in the side wall. Therefore, there are three pairs of said molds being needed to manufacture the optical transmission device, which has a large cost and difficulty to produce.

Hence, an improved connector is desired to overcome the above problems.

SUMMARY OF THE INVENTION

According to one aspect of the present invention, a connector comprises: an insulative housing having a mating port formed between a pair of opposite front wall and rear wall, and a pair of opposed side walls thereof, the mating port defining a first direction for mating/un-mating with a corresponding plug, and a second direction extending transversely and perpendicular to said first direction, and a third direction extending vertically and perpendicular to both said first and second directions; a shutter mechanism pivotally mounted to the insulative housing to open/close the mating port and having a pair of axles extending oppositely from two sides thereof in the second direction; wherein the side wall defines a first slot at an inner side thereof and a second slot at an outer side thereof, the second slot extending in the first direction, the first slot extending in a direction different from the second slot and partly overlapping with the second slot in the second direction to form an opening communicating with the mating port to receive the axles.

According to another aspect of the present invention, a connector comprises: an insulative housing having a mating port formed between a pair of opposite front wall and rear wall, and a pair of opposed side walls thereof, the mating port defining a first direction for mating/un-mating with a corresponding plug, and a second direction extending transversely and perpendicular to said first direction, and a third direction extending vertically and perpendicular to both said first and second directions; a shutter mechanism pivotally mounted to the insulative housing to open/close the mating port, the shutter mechanism having a pair of axles extending oppositely from two sides thereof in the second direction; wherein the side wall defines a first slot extending in the third direction at an inner side thereof and a second slot extending in the first direction at an outer side thereof, the first slot communicating with the second slot in the second direction to form an opening which communicates with the mating port to receive the axle and prevent the axle from moving in the first and third direction.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
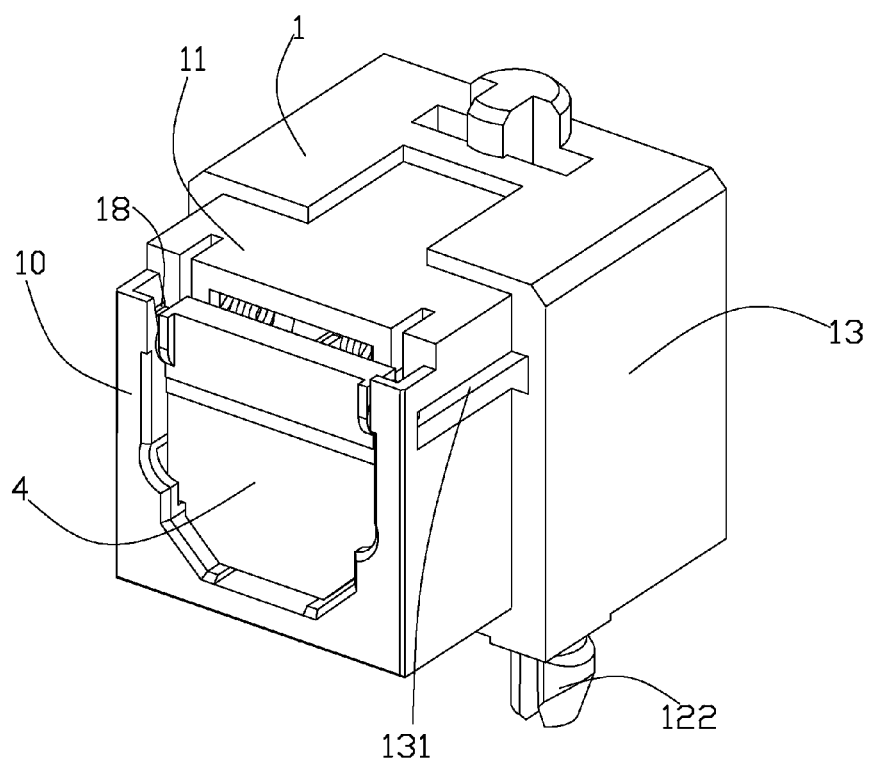
FIG. 1 is a perspective view of a connector according to the present invention.

Reference will be made to the drawing figures to describe the present invention in detail, wherein depicted elements are not necessarily shown to scale and wherein like or similar elements are designated by same or similar reference numeral through the several views and same or similar terminology.

Figure 2:
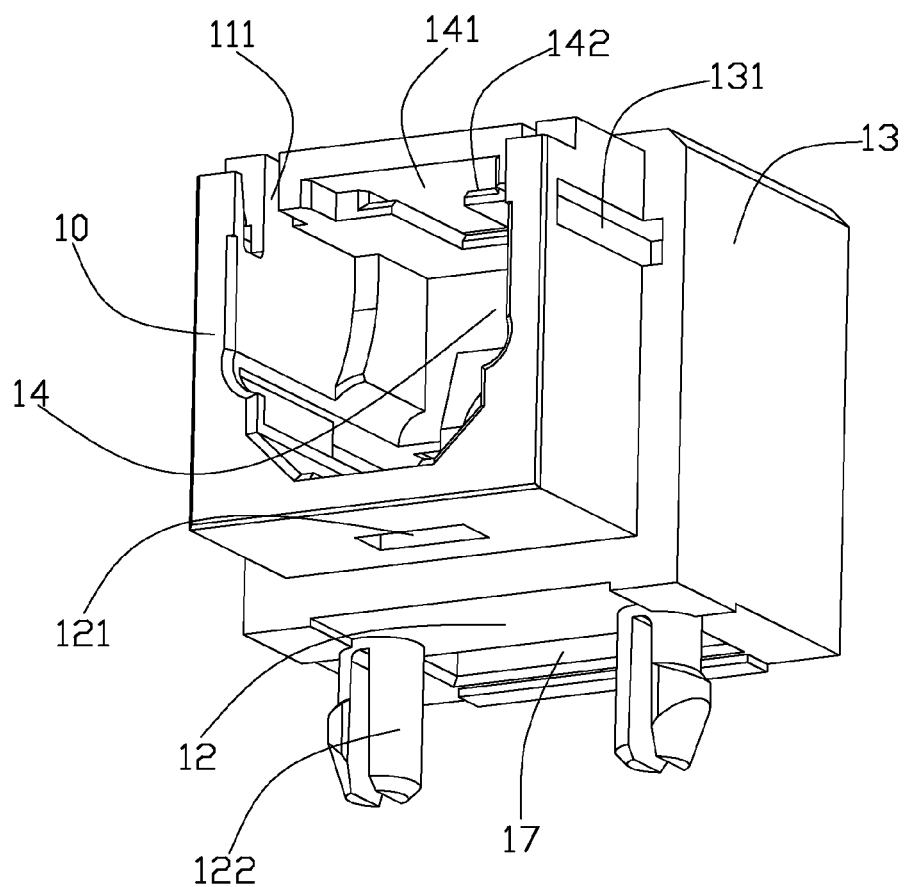
FIG. 2 is a perspective view of an insulative housing of the connector shown in FIG. 1.
Figure 3:
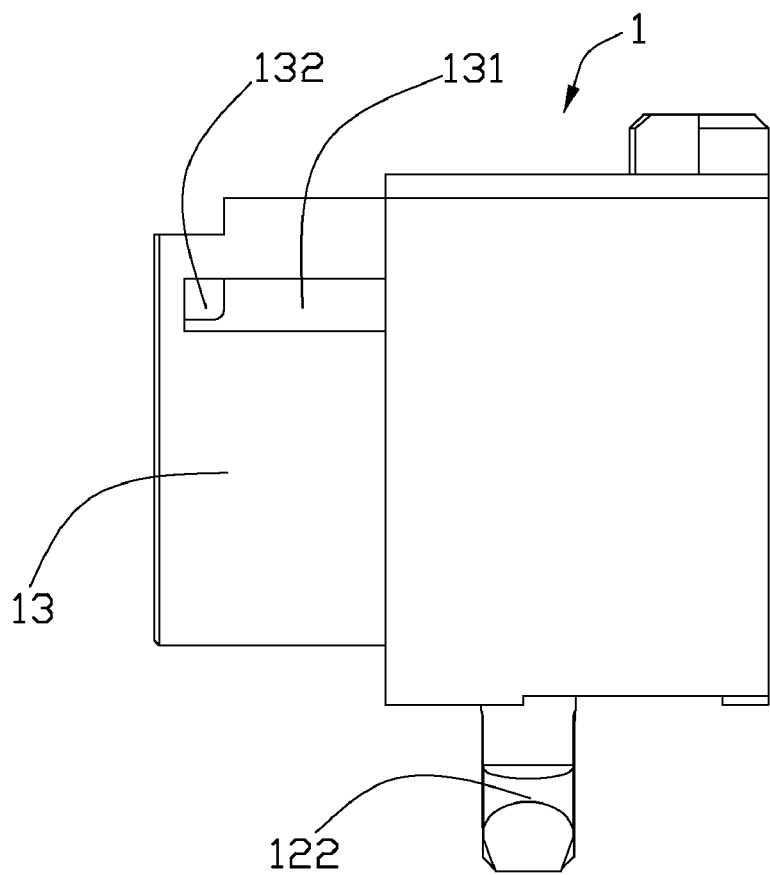
FIG. 3 is a view similar to FIG. 2, while taken from a different aspect.
Figure 4:
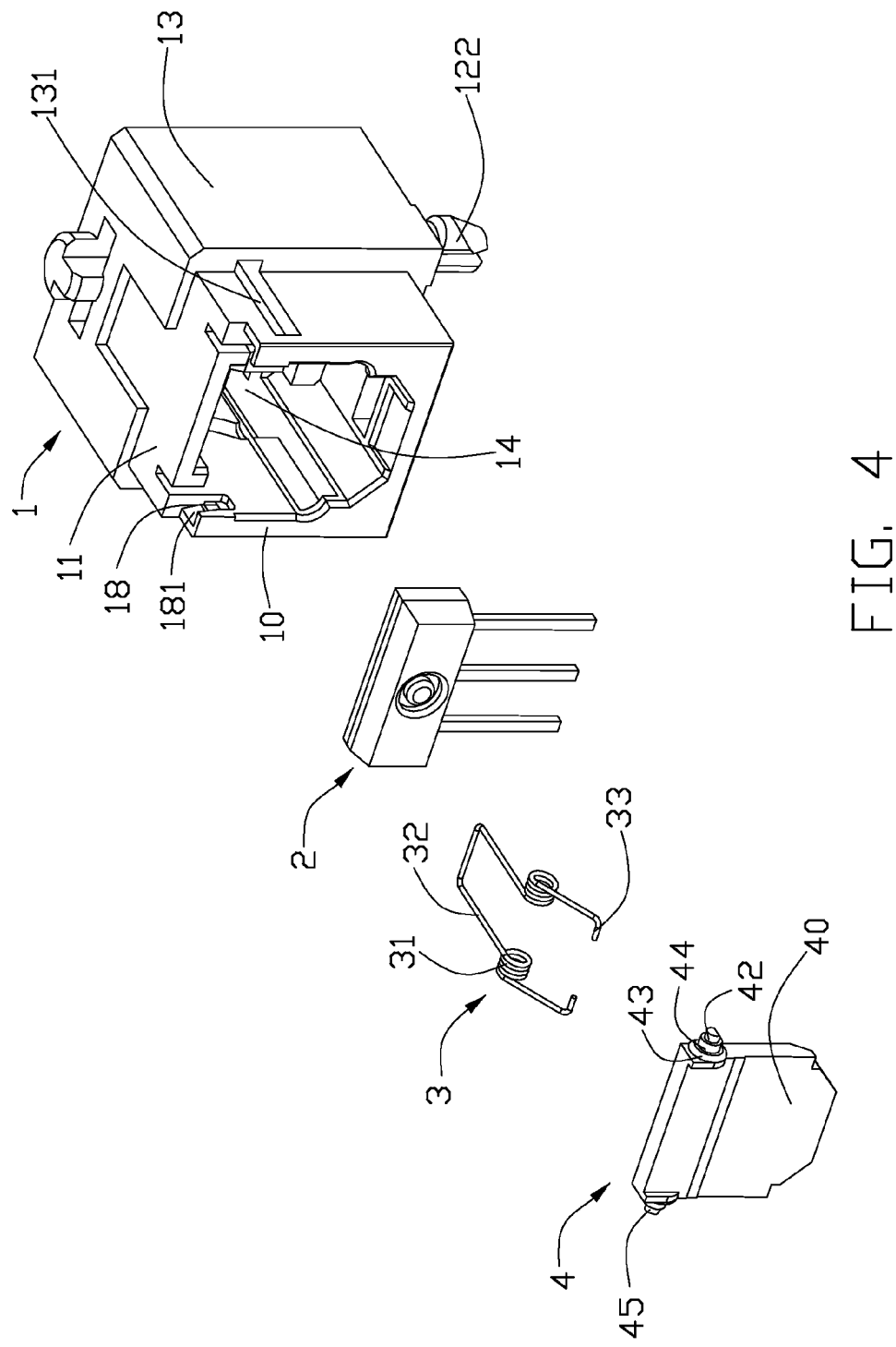
FIG. 4 is an exploded view of the connector shown in FIG. 1.
Figure 5:
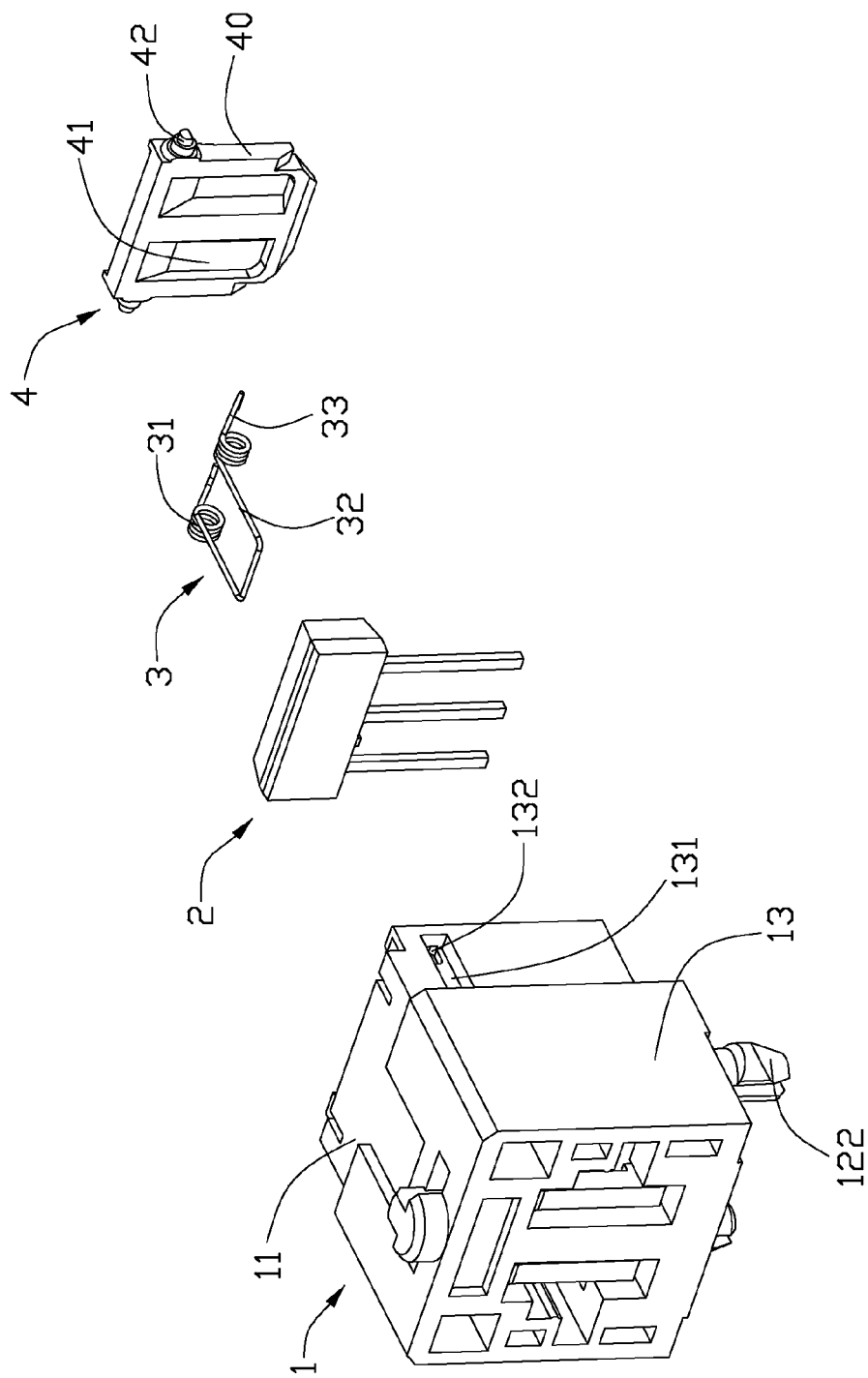
FIG. 5 is a view similar to FIG. 4, while taken from a different aspect.

Referring to FIGS. 1-5, a connector 100 for connecting with a corresponding plug (not shown) according to the present invention is disclosed. The connector 100 comprises an insulative housing 1, an optical component 2 mounted to the insulative housing 1 to transmit optical signals, a spring 3 retained in the insulative housing 1 and a shutter mechanism 4 pivotally mounted to the insulative housing 1.

The insulative housing 1 has a mating port 14 being formed between and covered by a pair of opposite front wall 10 and rear wall 19, a pair of opposite top wall 11 and bottom wall 12, and a pair of opposed side walls 13 thereof. The mating port 14 communicates with exterior through the front wall 10 and defines a first direction for mating/un-mating, and a second direction extending transversely and perpendicular to said first direction, and a third direction extending vertically and perpendicular to both said first and second directions.

The side walls 13 each defines a first slot 18 at an inner side thereof and a second slot 131 at an outer side thereof. The first slot 18 extends from a top end of the side wall 13 in the third direction and opens upwardly for assembling the shutter mechanism 2 from an upper side of the insulative housing 1 in the third direction. The second slot 131 extends from the rear wall 19 in the first direction and does not extend through the insulative housing 1 in the first direction. The first slot 18 communicates with the mating port 14 in the second direction and has a leading face 181 at a top end of an inner wall thereof to lead the shutter mechanism 4 being assembled to the insulative housing 1. The second slot 131 communicates with exterior and does not communicate with the mating port 14 in the second direction. The second slot 131 is located at an upper side of the side wall 13, and adjacent to the first slot 18 in the second direction. A lower end of the first slot 18 overlaps with a front end of the second slot 131 in the second direction to form an opening or a holding hole 132 to retain the shutter mechanism 4.

The top wall 11 defines a pair of slits 111 extending therethrough in the third direction and opens forwardly in the first direction. The slits 111 are located at two sides of the top wall 11 to make the side walls 13 flexible. Thereby when the shutter mechanism 4 is assembled to the insulative housing 1 in the third direction, the shutter mechanism 4 can push the side walls 13 outwardly along the leading face 181 and not spoil the insulative housing 1. When the shutter mechanism 4 is assembled completely, the side walls 13 can spring back and position the shutter mechanism 4 therebetween. The top wall 11 defines a receiving cavity 141 extending from a front end thereof in the first direction to retain the spring 3. The receiving cavity 141 is located between the slits 111 in the second direction. The insulative housing 1 has a partition plate 142 between the receiving cavity 141 and the mating port 14 to prevent the spring 3 from moving downwardly. The bottom wall 12 defines a rectangular hole 121 at a front side thereof and a receiving space 17 at a rear side thereof. The hole 121 communicates with the mating port 14 in the third direction for positioning the corresponding plug. The receiving space 17 spaces apart from the mating port 14 to receive the optical component 2. The receiving space 17 communicates with the mating port 14 in the first direction to optically connect the corresponding plug and the optical component 12. The insulative housing 1 has a pair of posts 122 extending downwardly from the bottom wall 12 thereof to position the connector 100 to a circuit board (not shown).

The spring 3 in the present invention is a torsion coil spring which has a pair of coil portions 31 at a middle position thereof, a U-shaped positioning portion 32 connecting with the coil portions 31 at one side thereof, and a pair of L-shaped arm portions 33 extending downwardly and forwardly from another side of the coil portions 31 respectively. The positioning portion 32 is retained in the receiving cavity 141, and the partition plate 142 is located at a lower side of the positioning portion 32 to prevent the positioning portion 32 from moving downwardly. The positioning portion 32 in the present invention is connected between the coil portions 31, of course, the positioning portion 32 can be designed as two L-shaped parts connecting with the coil portions 31 respectively, and the top wall 11 defines a pair of said receiving cavities 141 to retain the two positioning portions 32 respectively, which can also achieve the present invention's purpose. The arm portions 33 resist against a rear side of the shutter mechanism 4 to drive the shutter mechanism 4 opening or closing the mating port 14.

The shutter mechanism 4 has a door portion 40 extending in the third direction and a pair of axles 42 extending oppositely outwardly from two sides of the door portion 40 in the second direction. The axles 42 each has a first section 43 connecting with the door portion 40 directly to prevent the shutter mechanism 4 overly moving in the second direction, a second section 44 extending outwardly from the first section 44 and a third section 45 at an outer end of the axles 42. The first section 43 resists against an inner side of the side walls 13. The second section 43 is received in a mutual position of the first slot 18 and the opening 132 to strengthen the axles 42 and prevent the shutter mechanism 4 from moving in the first direction. The third section 45 is received in a mutual position of the second slot 131 and the opening 132 to prevent the shutter mechanism 4 from moving in the third direction. The first, second and third sections 43, 44 and 45 present as a ladder-shaped column partly received in the openings 132 to drive the door portion 40 moving around the axles 42. The first section 43 defines a diameter larger than that of the second section 44, and the second section 44 is larger than the third section 45.

The door portion 40 is located at a rear side of the front wall 10 and defines a pair of depression portions 41 at a rear side thereof to position the arm portions 33. The arm portions 33 move in the depression portions 41 in the third direction when the corresponding plug being inserted into or pulled out of the mating port 14. The coil portions 31 in the present invention are retained in the receiving cavity 141 and need not ring on the axles 42, which simplifies an assembly process of the connector 100 and can not be easily broke off.

As fully described above, the insulative housing 1 can be formed by a pair of front and rear molds (not shown) to form the mating port 14 thereof, and a pair of upper and lower molds (not shown) to form the hole 121, posts 122 and receiving space 17 thereof. In addition, the opening 132 is formed by the first slot 18 and the second slot 131 overlapping and communicating with each other in the second direction, and the first slot 18 extends in the third direction and can be formed by the pair of upper and lower mother molds, and the second slot 131 extends in the first direction and can be formed by the pair of front and rear mother molds. Therefore, there is not needed a pair of additional left and right children molds to form the openings 132, which simplifies a manufacture of the molds and decreases the manufacture cost.

In addition, all first and second slots 18, 131 are located at an upper side of the insulative housing 1, and the shutter mechanism is assembled to the insulative housing 1 from an upper side in the third direction; of course, all first and second slots 18, 131 can be located at a lower side of the insulative housing 1 or simultaneously at left or right sides of the insulative housing 1, and assembling the shutter mechanism 4 from a lower side, left or right sides in the third or second direction. Of course, the second slots 131 in above embodiment extend in the first direction, and the first slots 8 extend in a direction different from the second slots 131, which can also achieve the present invention's purpose.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A connector, comprising:
   an insulative housing having a mating port formed between a pair of opposite front wall and rear wall, and a pair of opposed side walls thereof, the mating port defining a first direction for mating/un-mating with a corresponding plug, and a second direction extending transversely and perpendicular to said first direction, and a third direction extending vertically and perpendicular to both said first and second directions;
   a shutter mechanism pivotally mounted to the insulative housing to open/close the mating port, the shutter mechanism having a pair of axles extending oppositely from two sides thereof in the second direction;
   wherein the side wall defines a first slot at an inner side thereof and a second slot at an outer side thereof, the second slot extending in the first direction, the first slot extending in a direction different from the second slot and partly overlapping with the second slot in the second direction to form an opening communicating with the mating port to receive the axles.

2. The connector as claimed in claim 1, wherein the first slot extends in the third direction and overlaps with the second slot at a lower end thereof.

3. The connector as claimed in claim 2, wherein the first slot is adjacent to the second slot in the second direction.

4. The connector as claimed in claim 2, wherein the side walls each has said first slot, and said first slot opens upwardly to mount the shutter mechanism from an upper side of the insulative housing in the third direction.

5. The connector as claimed in claim 4, wherein the insulative housing has a top wall covering the mating port from a top side thereof, and the top wall defines a pair of slits extending in the third direction to make the side walls flexible for assembling the shutter mechanism conveniently.

6. The connector as claimed in claim 5, further comprising a spring mounted in the insulative housing to driving the shutter mechanism moving around the axles, the top wall defines a receiving cavity extending from a front end thereof in the first direction to position the spring.

7. The connector as claimed in claim 6, wherein the spring has a positioning portion retained in the receiving cavity and a pair of arm portions extending downwardly and forwardly from two sides thereof to resist against the shutter mechanism.

8. The connector as claimed in claim 7, wherein the shutter mechanism has a door portion extending in the third direction between the axles to cover a front side of the mating port, and the door portion is located at an inner side of the front wall and defines a pair of depression portions at a rear side thereof to position the arm portions.

9. The connector as claimed in claim 7, wherein the insulative housing has a partition plate between the receiving cavity and the mating port to prevent the positioning portion from moving downwardly.

10. The connector as claimed in claim 1, further comprising an optical component mounted in the insulative housing, wherein the insulative housing has a receiving space at a rear side of the mating port to receive the optical component, and the receiving space communicates with the mating port in the first direction for connecting the optical component and the corresponding plug with each other.

11. The connector as claimed in claim 1, wherein the second slot extends through the rear wall in the first direction.

12. A connector, comprising:
    an insulative housing having a mating port formed between a pair of opposite front wall and rear wall, and a pair of opposed side walls thereof, the mating port defining a first direction for mating/un-mating with a corresponding plug, and a second direction extending transversely and perpendicular to said first direction, and a third direction extending vertically and perpendicular to both said first and second directions;
    a shutter mechanism pivotally mounted to the insulative housing to open/close the mating port, the shutter mechanism having a pair of axles extending oppositely from two sides thereof in the second direction;
    wherein the side wall defines a first slot extending in the third direction at an inner side thereof and a second slot extending in the first direction at an outer side thereof, the first slot communicating with the second slot in the second direction to form an opening which communicates with the mating port to receive the axle and prevent the axle from moving in the first and third direction.

13. The connector as claimed in claim 12, wherein the second slot extends through the rear wall in the first direction.

14. The connector as claimed in claim 13, wherein the second slot does not extend through the front wall in the first direction, and the first and second slots do not extend through the side wall in the second direction.

15. The connector as claimed in claim 14, wherein the first slot extends from a top end of the side wall, and the opening is formed at a lower end of the first slot and a front end of the second slot.

16. The connector as claimed in claim 15, wherein the side walls each has said first slot and said second slot, and said first slot opens upwardly to mount the shutter mechanism from an upper side of the insulative housing in the third direction.

17. The connector as claimed in claim 16, further comprising an optical component mounted in the insulative housing, wherein the insulative housing has a receiving space at a rear side of the mating port to receiving space, and the receiving space communicates with the mating port in the first direction for connecting with a corresponding plug.

18. A connector comprising:
    an insulative housing made from plastic via injection molding, and defining a front mating port with a receiving cavity in communication with an exterior via a front opening in a front face of the mating port of the housing, for receiving an inserted plug therein;
    a shutter pivotally mounted upon the front face and covering said front opening;
    an interlocking structure formed on both said shutter and said housing for fastening said shutter to the housing in a pivotal manner, said interlocking structure including a pair of pivotal axes protruding outwardly on two sides of the shutter, and a pair of holding holes in two side walls of the mating port of the housing; wherein
    each of said side walls defines an inner slot, in an inner face thereof, along which the corresponding pivotal axis moves during assembling the shutter to the housing, under condition that after assembled, an inner section of the pivotal axis is essentially located within the inner slot while an outer section of the pivotal axis extends outward beyond the inner slot in a transverse direction and essentially disposed in an outer slot formed in an outer face of the side wall; wherein said outer slot is angled with regard to said inner slot in a side view so as to cooperate with said inner slot to form the corresponding holding hole for restricting backward movement of the corresponding pivotal axis along said inner slot.

19. The connector as claimed in claim 18, wherein the outer slot extends in a horizontal direction same with an insertion direction of the plug into the receiving cavity while said inner slot extends in a vertical direction perpendicular to said horizontal direction.

20. The connector as claimed in claim 19, wherein said outer slot further extends rearward through a main body of the housing under condition that said main body is wider than the mating port, and the outer slot in the main body defines a greater depth than in the side wall of the mating port.

* * * * *